April 2, 1957  D. L. KAUFMAN  2,787,130
REFRIGERANT EXPANSION VALVE
Filed March 8, 1955
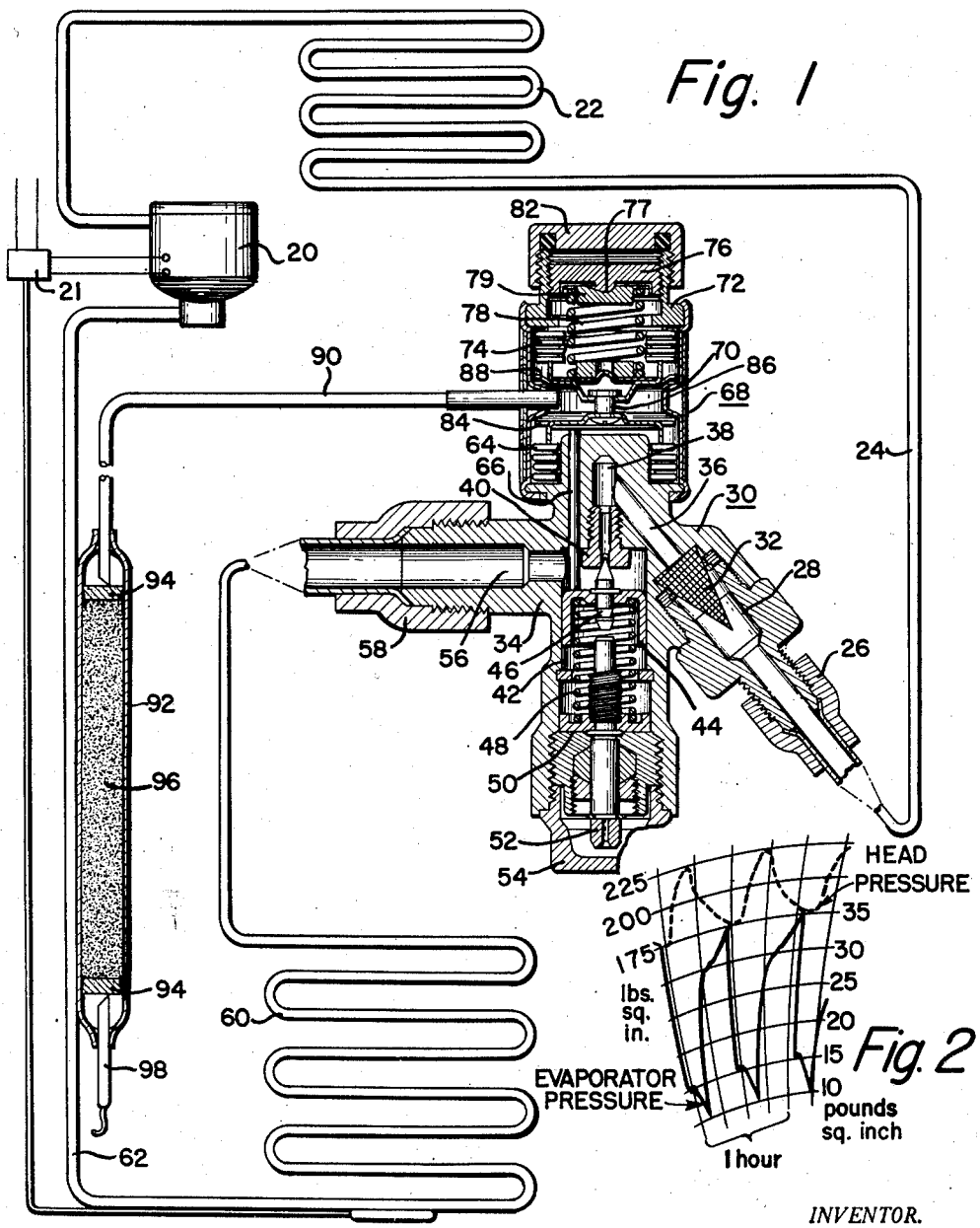
INVENTOR.
Daniel L. Kaufman
BY
His Attorney United States Patent Office 2,787,130
Patented Apr. 2, 1957

2,787,130

REFRIGERANT EXPANSION VALVE

Daniel L. Kaufman, Dayton, Ohio, assignor to General Motors Corporation, Detroit, Mich., a corporation of Delaware Application March 8, 1955, Serial No. 492,845

1 Claim. (Cl. 62—8)

This invention relates to refrigerating apparatus and more particularly to automatic thermostatic expansion valves provided with a pressure limiting arrangement.

Pressure limiting expansion valves are now being used in apparatus where suction regulating valves were formerly used. While theoretically the pressure limiting expansion valve should limit the suction pressure without adversely affecting the proper and maximum refrigerant flow, under normal conditions, I have found that the most convenient forms of pressure limiting expansion valves are erratic in performance and do not provide a constant limit upon suction pressure.

It is an object of this invention to provide a thermostatic automatic expansion valve having a pressure limiter in which the superheat and the limiting pressure are individually adjustable and which accurately set the super heat and the back pressure and the limiting pressure under all expected conditions of operation.

It is another object of this invention to provide a thermostatic automatic expansion valve having a pressure limiter which has sufficient flexibility and ease of movement to provide a constant accurate performance under varying temperature conditions.

These and other objects are attained in the form shown in the drawing in which an adjustable spring normally urges a guide carrying the valve needle into engagement with the valve seat for controlling the incoming refrigerant. A first bellows sealed to the valve body is exposed to refrigerant pressure in the outlet of the valve body. Three pins extend between the movable end of the first bellows and the guide for controlling the opening of the valve needle. A second bellows is inverted relative to the first and has its open end connected by a sleeve to the valve body adjacent the bottom end of the first bellows to provide a sealed chamber between the two bellows. The second bellows contains a compression spring provided with an adjustable anchorage sealed by a threaded cap. The two bellows are connected by a lost motion connection to limit the suction pressure. A thermostat bulb is connected to the chamber between the two bellows. This bulb system is charged with a gas non-condensible under the conditions of operation. The bulb is charged with a solid adsorbent capable of adsorbing and evolving the gas under varying temperatures.

Further objects and advantages of the present invention will be apparent from the following description, reference being had to the accompanying drawings, wherein a preferred form of the present invention is clearly shown.

In the drawings:

Figure 1 is a diagram of a refrigerating system embodying one form of my improved pressure limiting valve; and Figure 2 is an evaporator pressure-time chart.

Referring now more particularly to Figure 1, there is shown a refrigerating system including the sealed motor compressor unit 20 having its outlet connected to a condenser 22. The outlet of the condenser 22 is connected by a conduit 24 and a flare connection 26 to the inlet 28 of the pressure limiting expansion valve 30. The inlet 28 connects with a chamber in the valve body 34 containing a conical screen 32. The screen chamber connects with an inlet passage 36 extending at an angle and joining an axially located downwardly extending passage 38. The bottom of this passage 38 is provided with a valve seat insert 40.

The valve seat 40 opens into a cylindrical chamber 42 which receives a slidable valve guide 44 carrying the valve needle 46. The valve guide 44 is urged upwardly by the spring 48. This spring 48 is supported upon the spring retainer 50 which is adjusted by the adjusting screw 52. The adjusting screw 52 is enclosed by the threaded cap 54 which threads onto the bottom of the valve body 34. The valve body 34 is provided with an outlet portion 56 provided with a flare connection 58 connecting to the inlet of the refrigerant evaporator 60. The outlet of the evaporator 60 is connected by a conduit 62 to the inlet of the motor compressor unit 20.

Connected to the upper portion of the valve body 34 is the open end of a flexible metal bellows 64. Three symmetrically located push pins 66 extend through the upper portion of the valve body 34 between the closed end of the bellows 64 and the top of the valve guide 44. The portion of the valve thus described provides a satisfactory form of automatic expansion valve. For the purpose of providing a means for limiting the suction pressure in the system at the start of operating cycles, to the upper portion of the valve body around the bellows 64 there is attached and sealed a sleeve 68. This sleeve 68 has an internal central annular necked in portion 70. At the top, this sleeve 68 is sealed to a ring 72. The upper open end of a second metal bellows 74 is also sealed to the ring 72. The ring 72 is threaded internally and externally at its upper end. The internal threads support the upper spring retainer nut 76 having a downwardly projecting central bearing 77 which rotatably supports the upper spring retainer 79 of compression spring 78. The lower end of this spring 78 is supported upon the closed lower end of the bellows 74. This upper spring retainer nut 76 is provided with a screw driver slot by which it may be turned to adjust the tension of the spring 78. The upper end of the ring 72 is closed by a threaded cap 82. This prevents the access of atmosphere and dirt to the interior of the bellows 74.

Fastened to the upper end of the bellows 64 is a plate member 84 which is sufficiently large to engage the necked in portion 70 of the sleeve 68 to limit the expansion of the bellows 64 under extreme pressure conditions. Riveted to this plate 84 is a stud 86 provided with an enlarged head. The lower closed end of the metal bellows 74 is provided with a plate 88 having a central downwardly extending projection containing a central aperture. The upper end of the stud 86 extends through this aperture in the central depressed portion of the plate 88 and has a head above the plate 88 and larger than the opening in the plate 88. This provides a connection through the stud between the two bellows when the pressure inbetween the bellows is high enough to spread apart the adjacent closed ends of the bellows far enough to cause the head of this stud 86 to engage the depressed portion of the plate 88. When the pressure is lowered in the chamber between the two bellows, the stud 86 will move upward freely within the aperture in the plate 88 to free the bellows.

The interior of the sealed chamber between the bellows 64 and 74 within the sleeve 68 is connected by the capillary tube 90 to the upper end of the thermostat bulb 92. This thermostat bulb 92 is mounted in direct heat exchange relationship with the suction conduit immediately adjacent the evaporator 60 so that it is directly responsive to the temperature of the refrigerant leaving the evaporator. The bulb 92 is provided with upper and lower porous brass inserts 94. Between these inserts 94, the bulb is filled with activated charcoal adsorbent 96. The interior of the bulb 92, the capillary tube 90 and the chamber are charged with a suitable gas non-condensible under operating conditions. For example, carbon dioxide is forced through the charging tube at the bottom end of the bulb 92 until a selected pressure is reached. At the termination of the charging operation, the charging tube 98 is sealed and disconnected from the charging apparatus. The superheat at the outlet of the evaporator 60 controls the temperature of the activated charcoal 96 to control the pressure of the carbon dioxide acting upon the top of the bellows 64 to regulate the opening of the valve needle 46 during the operation of the motor compressor unit 20. When the unit 20 is idle, the pressure rises.

As shown in Figure 2, at the start of each cycle the evaporator pressure falls rapidly down to approximately 15 inches of mercury. This indicates that the valve remains closed during this rapid pull down. During this time the pressure in the chamber between the bellows 64 and 74 is sufficient to hold the two closed ends of the bellows connected by the engagement of the stud 86 with the plate 88. This in effect cancels out the effect of the two bellows and the valve operates as an automatic expansion valve preventing the opening of the valve until the pressure in the outlet portion of the valve becomes low enough that the force of the spring 48 is overcome to allow the opening of the valve needle 46. This depends upon the adjustment of this screw 52 and the nut 76. This screw 52 may be adjusted to have this opening occur at any reasonable pressure. The adjustment of the screw 52 and the nut 76 affect each other. As shown in Figure 2 in this particular installation it is set to allow the opening at about 15 inches of mercury.

The valve operates as an automatic expansion valve until the refrigerant is forced into and cooled by evaporation in the evaporator 60 and its cooling effect has cooled the activated charcoal 96 within the bulb 92. The cooling of the activated charcoal 96 causes it to adsorb carbon dioxide thereby reducing the pressure within the closed system including the chamber between the bellows 64 and 74. This allows the spring 78 to move the plate 88 downwardly away from the head of the stud 86 until it is stopped by the necked in portion 70 of the sleeve 68. The pressure within the chamber between the closed ends of the bellows 64 and 74 then acts upon the top of the bellows 64 to cause the valve to operate as a normal thermostatic expansion valve. The lowering of the pressure in the chamber between the bellows causes the valve to throttle and lower the evaporator pressure from 15 inches of mercury to nearly 10 inches of mercury.

The operation of the motor compressor unit is terminated by the thermostatic switch 21 which controls the operation of the motor compressor unit. During the idle period, the evaporator pressure rises to about 35 inches of mercury while at the same time the head or condenser pressure is falling from about 225 to 175 pounds. During this idle period the activated charcoal 96 warms up and expels carbon dioxide thereby raising the pressure within the chamber between the bellows 74 and 64 until the bellows 74 collapses and causes the plate 88 to engage the head of the stud 86. This allows the spring 48 to move the valve needle 46 to the closed position and prevent any flow of refrigerant into the evaporator 60 until the evaporator pressure is again reduced to about 15 inches of mercury during the next operating cycle.

By the use of this combination of activated charcoal and carbon dioxide with this particular bellows and spring arrangement shown herein, I have provided a pressure limiting automatic expansion valve which is constant in its characteristics, easy to adjust and which retains its operating characteristics and calibration over all expected operating conditions for indefinite periods of time without attention. The super heat adjustment screw 52 and the pressure limiting adjusting screw or nut 76 are readily accessible and easily and accurately adjusted. The bellows are much more sensitive than diaphragms and provide a much more accurate and reliable control. The use of a permanent gas thermostatic system avoids the erratic performance found in sluggish liquid charged thermostatic systems.

In accordance with the provisions of rule 78a, reference is made to the following prior filed application: S. N. 434,525 filed June 4, 1954, now Patent No. 2,752,760, granted July 3, 1956.

While the form of embodiment of the invention as herein disclosed constitutes a preferred form, it is to be understood that other forms might be adopted, as may come within the scope of the claim which follows.

What is claimed is as follows:

A thermostatic expansion control for controlling refrigerant flow into an evaporator and for limiting the refrigerant pressure in the evaporator including a valve body having an inlet receiving refrigerant and an outlet connected to an evaporator, a valve in said valve body for controlling the flow of refrigerant from said inlet to said outlet, a first metal bellows having its open end sealed to said valve body, a second metal bellows having its closed end adjacent to the closed end of the first bellows, a metal sleeve surrounding said bellows and having one portion connected to and sealed to the valve body and having a second portion connected to and sealed to the closed end of the second bellows, said sleeve having a threaded extension, a threaded adjusting member threaded to said threaded extension, spring means within said second bellows exerting its force between said adjusting means and the closed end of said second bellows, said sleeve having an inwardly extending projection forming a stop for limiting the expansion of said second bellows, a lost motion connection connecting the closed ends of said bellows, operating means operably connecting said first bellows and said valve, and a thermostat bulb and tubing connected to said sleeve and communicating with the space formed between the first and second bellows.

References Cited in the file of this patent

UNITED STATES PATENTS

| | | |
|---|---|---|
| 1,913,297 | Strong | June 6, 1933 |
| 2,221,633 | Dasher | Nov. 12, 1940 |
| 2,519,483 | Lange | Aug. 22, 1950 |
| 2,542,802 | Ehlke | Feb. 20, 1951 |